United States Patent
Sekine et al.

(10) Patent No.: US 7,285,189 B2
(45) Date of Patent: Oct. 23, 2007

(54) METHOD FOR STEAM REFORMING OF CHAIN HYDROCARBON

(75) Inventors: Yasushi Sekine, Shinjuku-ku (JP); Kouhei Urasaki, Shinjuku-ku (JP); Shigeru Kado, Meguro-ku (JP); Kaoru Fujimoto, Kitakyushu (JP)

(73) Assignee: Yasushi Sekine, Tokyo (JP)

( * ) Notice: Subject to any disclaimer, the term of this patent is extended or adjusted under 35 U.S.C. 154(b) by 400 days.

(21) Appl. No.: 10/296,174

(22) PCT Filed: Mar. 19, 2001

(86) PCT No.: PCT/JP01/02159

§ 371 (c)(1),
(2), (4) Date: Jun. 10, 2003

(87) PCT Pub. No.: WO01/89988

PCT Pub. Date: Nov. 29, 2001

(65) Prior Publication Data

US 2004/0003539 A1    Jan. 8, 2004

(30) Foreign Application Priority Data

May 24, 2000    (JP) .............................. 2000-152432

(51) Int. Cl.
    *C01B 3/24*    (2006.01)
(52) U.S. Cl. .................................................... 204/164
(58) Field of Classification Search ................. 204/164
See application file for complete search history.

(56) References Cited

U.S. PATENT DOCUMENTS

| | | | |
|---|---|---|---|
| 4,435,374 A * | 3/1984 | Helm, Jr. ................. 423/418.2 |
| 5,015,349 A | 5/1991 | Suib et al. |
| 5,164,054 A * | 11/1992 | Cha et al. ................ 204/157.47 |
| 5,198,084 A * | 3/1993 | Cha et al. ................ 204/157.47 |
| 5,650,132 A * | 7/1997 | Murata et al. ............... 423/650 |
| 6,372,156 B1* | 4/2002 | Kong et al. .................. 252/373 |
| 6,670,058 B2* | 12/2003 | Muradov ...................... 429/17 |
| 2002/0074221 A1* | 6/2002 | Mallinson et al. .......... 204/170 |

FOREIGN PATENT DOCUMENTS

| EP | 600738 A1 | 6/1994 |
|---|---|---|
| FR | 2757499 | * 6/1998 |
| WO | WO 98/28223 A1 | 7/1998 |
| WO | WO 01/09031 A1 | 2/2001 |

OTHER PUBLICATIONS

Kado et al., Chem. Comm., No. 5, pp. 415-416 (2001), no month.
Urazaki et al., Dai 30, kai, pp. 283-284 (2000), no month.
Urazaki et al., Dai 43 kai, pp. 81 (2000), no month.
Sekine et al., Dai 9 kai, pp. 203-206 (2000), no month.
Okumoto et al., Seidenki Gakkai Koen Ronbunshu, pp. 243-246 (1999), no month.

* cited by examiner

*Primary Examiner*—Wayne A. Langel
(74) *Attorney, Agent, or Firm*—Birch, Stewart, Kolasch & Birch, LLP

(57) ABSTRACT

Disclosed is a novel method for steam reforming, by which selectivity to carbon monoxide is high, which is free from various side reactions, which may be carried out at a lower temperature and at a lower pressure than the conventional methods, and which may be carried out even if a catalyst is not used. In the method of the present invention, direct current pulse discharge is performed in a mixed gas containing a gaseous chain hydrocarbon and water vapor so as to react the chain hydrocarbon and the water vapor, thereby generating hydrogen and carbon monoxide.

11 Claims, 1 Drawing Sheet

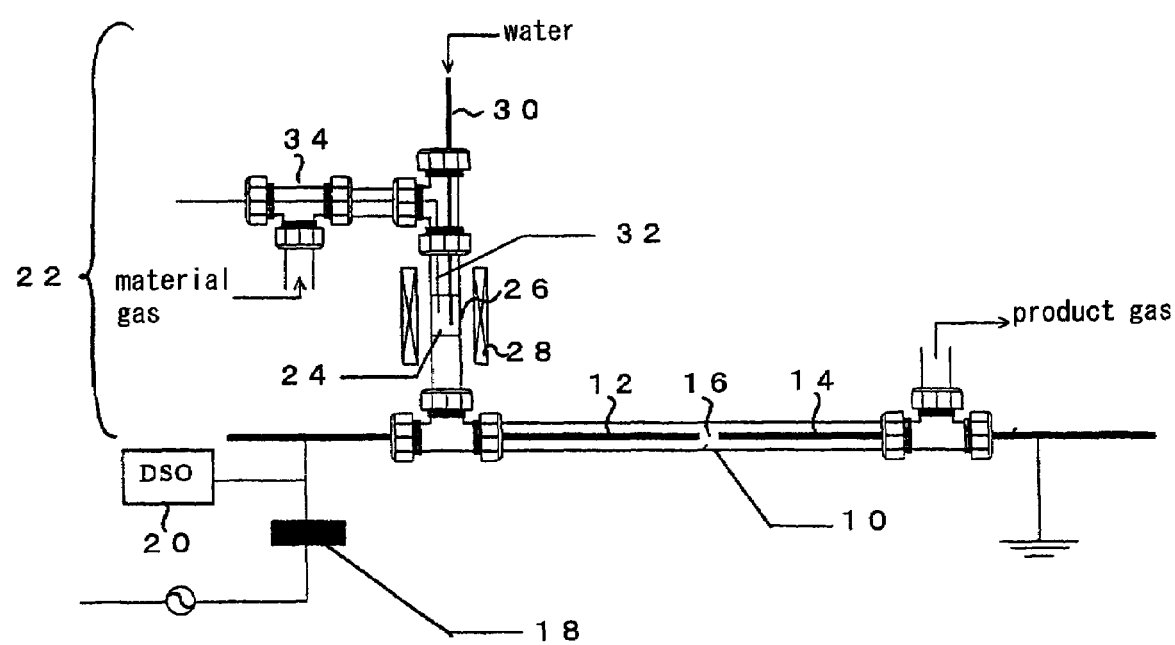

METHOD FOR STEAM REFORMING OF CHAIN HYDROCARBON

This application is the national phase under 35 U.S.C. § 371 of PCT International Application No. PCT/JP01/02159 which has an International filing date of Mar. 19, 2001, which designated the United States of America.

TECHNICAL FIELD

The present invention relates to a method for steam reforming of chain hydrocarbons.

BACKGROUND ART

Steam reforming is a method for producing hydrogen and carbon monoxide by the reaction between a hydrocarbon and water vapor. The general chemical reaction of steam reforming is as follows:

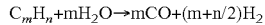
$$C_mH_n + mH_2O \rightarrow mCO + (m+n/2)H_2$$

The mixed gas (called "synthesis gas") of hydrogen and carbon monoxide obtained by steam reforming is an important raw material in industries, which is a fundamental material in the field called C1 chemistry. It is used as the material for synthesizing methanol and dimethyl ether, and is also used as the material for Fischer-Tropsch reaction utilized for the production of gasoline and the like.

Conventionally, steam reforming of hydrocarbons is carried out using a nickel catalyst carried on alumina under conditions of high temperature and high pressure at about 700 to 830° C. and 15 to 40 atm.

However, the conventional steam reforming method has problems in that the selectivity to carbon monoxide (i.e., the ratio of the number of carbon atoms in the generated carbon monoxide based on the number of carbon atoms constituting the hydrocarbon) is relatively low, and various side reactions occur so that the products of the side reactions may clog the reaction tube and may deteriorate the catalyst. Further, since the reaction is carried out at a high temperature and high pressure, it is necessary to use a tough reaction apparatus which withstands to the high temperature and high pressure. Further, cost is required for the energy to realize the high temperature and high pressure.

DISCLOSURE OF THE INVENTION

Accordingly, an object of the present invention is to provide a novel method for steam reforming by which the selectivity to carbon monoxide is high, which is free from the various side reactions, which may be carried out at a lower temperature and lower pressure than in the conventional method, and which may be carried out even without a catalyst.

The present inventors intensively studied to discover that by performing direct current pulse discharge in a mixed gas of a chain hydrocarbon and water vapor, hydrogen and carbon monoxide are generated at a temperature much lower than that employed in the conventional method under atmospheric pressure with a high selectivity to carbon monoxide, without the various side reactions, and with a high conversion ratio of the hydrocarbon, thereby completing the present invention.

That is, the present invention provides a method for steam reforming of chain hydrocarbons comprising performing direct current pulse discharge in a mixed gas containing a gaseous chain hydrocarbon and water vapor so as to react said chain hydrocarbon and said water vapor to generate hydrogen and carbon monoxide. The present invention also provides an apparatus for carrying out said method for steam reforming according to the present invention, comprising a reactor; a pair of electrodes contained in said reactor; a direct current power source for applying direct current voltage to said pair of electrodes.

By the present invention, a method for steam reforming of chain hydrocarbons was provided, by which the selectivity to carbon monoxide is high, which is free from the various side reactions, which may be carried out at a lower temperature under a lower pressure than in the conventional method, and which may be carried out even without using a catalyst. According to the method of the present invention, since the selectivity to carbon monoxide is high and since the various side reactions do not occur, the generated synthesis gas may be industrially used as it is. Even when the separation of acetylene which is a side product is desired, the desired product may be purified easier than in the conventional method. Further, since the catalyst is not used, or even if a catalyst is used, since the temperature is low, the method is free from the problem of the degradation of the catalyst. Further, since the method may be carried out at a low temperature under atmospheric pressure, a tough reaction apparatus is not required, and the reaction apparatus may be made compact and portable. Still further, by co-employing the water-gas-shift reaction, hydrogen gas may be efficiently produced, so that a hydrogen gas-producing apparatus which is compact and portable may also be provided.

BRIEF DESCRIPTION OF THE DRAWINGS

The FIGURE is a drawing which schematically shows the constitution of the reaction apparatus used in the Example of the present invention.

BEST MODE FOR CARRYING OUT THE INVENTION

The chain hydrocarbon used as the material for the steam reforming method according to the present invention is not restricted as long as it is a chain hydrocarbon, $C_1$-$C_{10}$ hydrocarbons which are in the form of gas at a relatively low temperature are preferred, and $C_1$-$C_{10}$ alkanes are preferred. The hydrocarbon may be linear or branched. The chain hydrocarbon may be a purified one or partially purified one (e.g., commercially available propane gas (which may contain propylene) or butane gas (which may contain butylene) or the like). Alternatively, naturally occurring materials such as natural gas containing much methane, and petroleum naphtha containing much pentane and hexane may be used as they are as the materials for the method of the present invention.

The direct current pulse discharge is to make pulsed direct current pass between electrodes. Although the direct current pulse discharge may be carried out by using a pulse electric power source, self-induced pulse discharge conducted by applying a constant voltage between the electrodes is preferred. In this case, the number of pulse discharge per second (hereinafter also referred to as "pulse generation frequency") is preferably about 5 to 500 times, more preferably 20 to 200 times. Under a constant voltage, the greater the electric current, the more the pulse generation frequency, and the longer the distance between the electrodes, the smaller the pulse generation frequency. Thus, the preferred voltage, current and the distance between the electrodes are naturally selected by adjusting the voltage, current and the distance between the electrodes such that the above-mentioned pulse generation frequency is attained. For example, in case of using a small reaction vessel having an inner diameter of about 4.0 mm used in the Examples below, the voltage to be applied is preferably about 1.5 kV to 6.0 kV, and the distance between the electrodes is preferably about 0.5 mm to 10 mm. Needless to say, the distance between the electrodes and the voltage applied are not restricted to the these ranges. In cases where a large apparatus having a large production ability is desired, the distance between the electrodes may be made longer, and the voltage applied and the current may be made larger so as to attain the above-mentioned pulse generation frequency, thereby a larger apparatus may be provided. It is thought that the reason why the reforming reaction is caused by the method of the present invention is that radicals are generated by the irradiation of electron beams, and the radicals cause the reaction. Therefore, the larger the discharged current, and the longer the distance between the electrodes, the more the number of molecules which collide with the electron beams, and so the higher the reaction rate and the higher the conversion rate in a unit time.

Although the reaction temperature is not restricted, since the lower the reaction temperature, the lower the energy cost and the less the side reactions, the reaction temperature is preferably as low as possible within the temperature range higher than the boiling points of both the chain hydrocarbon and water which are the starting materials. Thus, in cases where the chain hydrocarbon is an alkane, the boiling point of water is higher than that of the alkane up to heptane having 7 carbon atoms, so that the reaction temperature is preferably about 101° C. to 130° C. when the reaction is carried out under atmospheric pressure. In cases where the boiling point of the hydrocarbon which is the starting material is higher than that of water, a reaction temperature little higher than the boiling point of the chain hydrocarbon is preferred. For example, in case of decane, a reaction temperature of about 170° C. to 180° C. is preferred. Since water vapor tends to be condensed, it is preferred to preheat the mixed gas containing water vapor at a temperature higher than the reaction temperature, such as about 130-150° C., and then to supply the mixed gas to the reaction vessel, in cases where the boiling point of the hydrocarbon is lower than that of water.

The total pressure of the reactants are not restricted, and may be, for example, about 0.1 to 10 atm. However, since the reaction proceeds sufficiently under atmospheric pressure, it is especially advantageous industrially to carry out the reaction under atmospheric pressure, which does not necessitate the use of a tough reaction apparatus. Even in cases where a naturally occurring material containing impurities, such as natural gas or petroleum naphtha is used, the reaction may be carried out under atmospheric pressure. The mixing ratio of the water vapor to the chain hydrocarbon may be stoichiometric. However, if desired, the amount of one of the substances may be changed to ½ to 2 times of the stoichiometric amount. For example, by increasing the partial pressure of water vapor to higher than the stoichiometric pressure, the selectivity to carbon monoxide is increased (however, the conversion ratio of the material is decreased).

The reaction may be carried out by either batch process or continuous process, and continuous process is preferred industrially. In case of conducting the reaction by a continuous process, it is preferred to continuously supply the chain hydrocarbon and water vapor to a reaction tube harboring discharge electrodes therein as described in Examples below. In case of continuous process, the rate of supply of the materials may be appropriately adjusted such that the conversion ratio of the materials is kept at not less than a desired value, e.g., not less than 60%, by analyzing the gas discharged from the outlet of the reaction tube. In the case where a reaction tube having an inner diameter of 4.0 mm is used, the distance between the electrodes is about 0.5 mm to 10 mm, and the applied voltage is about 1.5 to 6.0 kV, the supply flow rate of the mixed gas of the hydrocarbon and water vapor may preferably be about 10 to 60 ml/min., more preferably about 15 to 30 ml/min.

By the method of the present invention, hydrogen and carbon monoxide are mainly produced according to the above-described chemical reaction. There is a side reaction in which the hydrocarbon is decomposed to yield C2 compounds mainly acetylene and hydrogen, but a side reaction other than this reaction does not substantially occur. Thus, when a pure chain hydrocarbon is used as the material, compounds other than hydrogen, carbon monoxide and C2 compounds are not substantially generated. Hydrogen generated by the side reaction is a component of synthesis gas, and hydrogen-rich synthesis gas has a high utility in industries, so that the hydrogen may be utilized by incorporating the hydrogen as it is in the synthesis gas. The C2 compounds such as acetylene are also widely used as industrial materials, so that they may be utilized industrially. The product gas has a high utility in industries even without a separate purification step. In cases where it is desired to separate the synthesis gas from acetylene which is the side product, it may be attained by a known method such as a method in which the hydrocarbon alone is absorbed in a hydrocarbon oil having a molecular weight of about 200, or PSA (Pressure Swing Adsorption) method in which pressure swing adsorption is carried out. Since products other than hydrogen, carbon monoxide and C2 compounds are not substantially produced, the method is free from the problem in that the reaction tube is clogged by side reaction products.

By the method of the present invention, the selectivity of the carbon atoms to carbon monoxide is as high as about not less than 45%, especially not less than about 65%, and the conversion ratio of the hydrocarbon is also as high as not less than 80%. Therefore, the method of the present invention is excellent as a method of producing synthesis gas. Further, it is a great advantage of the present invention that the above-described reaction well proceeds even in the absence of a catalyst. Since the catalyst is not used, the method is free from the problem that the reaction rate is decreased due to the decrease in the catalytic activity. The fact that substantially only one type of side reaction occurs is thought to stem from the fact that the catalyst is not used. However, in the method of the present invention, it is also possible to co-employ the conventional nickel catalyst or the like carried on alumina. Even when the catalyst is used, since the reaction is carried out at a much lower temperature and lower pressure than in the conventional methods, it is thought that the degradation of the catalytic activity and the generation of side reactions are much smaller than in the conventional method.

As mentioned above, the method of the present invention is excellent as a method for producing synthesis gas. Since the reforming is performed using water vapor, the ratio of the hydrogen gas in the product is inevitably high. Therefore, the method of the present invention may advantageously be applied to the production of hydrogen gas. In cases where the production of hydrogen gas is aimed at, the efficiency may be further promoted by carrying out the so called water-gas-shift reaction comprising reacting the generated carbon monoxide with water vapor to produce hydrogen gas and carbon dioxide. The water-gas-shift reaction per se is well-known in the art, so that it may be carried out by a well-known method even when it is added to the method of the present invention. Since the water-gas-shift reaction proceeds at a low temperature under atmospheric pressure, the production efficiency of hydrogen may largely be promoted by, for example, packing a catalyst for water-gas-shift reaction, e.g., zinc oxide-copper oxide solid catalyst in the outlet of the reaction tube, thereby reacting the generated carbon monoxide with water vapor to yield carbon dioxide and hydrogen. Especially, the amount of the generated hydrogen gas per one molecule of the hydrocarbon increases with the number of carbon atoms in the hydrocarbon. For example, in case of decane, 31 times amount of hydrogen gas is obtained from one molecule of decane.

By the method of the present invention, hydrogen gas is obtained from immediately after the initiation of the reaction, that is, the response is quick, and the hydrogen gas may be continuously produced at a low temperature under atmospheric pressure. Therefore, by the present invention, a small and portable hydrogen-producing apparatus may be provided. Such a hydrogen-producing apparatus may be mounted on a car or the like, and may be used as a hydrogen-supplying apparatus for fuel battery.

The present invention will now be described more concretely by way of examples thereof. It should be noted that the present invention is not limited to the examples below.

EXAMPLE 1

Preparation of Reaction Apparatus

A reaction apparatus having the constitution schematically shown in FIG. 1 was prepared. The reaction apparatus comprises a quartz tube 10 as a reaction tube. The quartz tube 10 had an outer diameter of 6.0 mm, inner diameter of 4.0 mm, and a length of 200 mm. In the quartz tube 10, a pair of electrodes 12 and 14 facing each other are arranged. The space between the electrodes 12 and 14 is the discharge region 16. Each electrode extends to the outside of the quartz tube. To the electrode 12, a negative high voltage power source 18 is connected, and a digital oscilloscope 20 is connected between the negative high voltage power source 18 and the electrode 12. The electrode 14 is grounded at the outside of the quartz tube 10. A three way port is connected to the inlet of the quartz tube 10. The electrode 12 penetrates the two ports arranged in the lateral direction, and a mixed gas-supplying section 22 is connected to one port (gas inlet) facing upward. The mixed gas-supplying section comprises a tube 26 in which quartz wool 24 is packed, a preheater 28 enclosing the region of the tube 26, at which the quartz wool is packed, a water vapor-supplying tube 30 whose one end opens in the quartz wool 24 and whose another end opens at the upper outside of the tube 26, a thermocouple 32 whose one end is inserted into the quartz wool 24, and a hydrocarbon-supplying tube 34 consisting of a tube branched in the lateral direction at the upper portion of the tube 26. A three way port is connected to the inlet of the hydrocarbon-supplying tube 34. A conductive wire connected to the thermocouple penetrates the two ports arranged in the lateral direction, and the hydrocarbon is supplied through the port facing downward. A three way port is also connected to the outlet of the quartz tube 10. The electrode 14 penetrates the two ports arranged in the lateral direction, and the product gas is collected from the port (gas outlet) facing upward. The distance between the electrodes 12 and 14 can be adjusted arbitrarily.

EXAMPLE 2

Steam Reforming of Methane

After setting the distance between the electrodes of the apparatus prepared in Example 1 to 4.9 mm, water vapor was supplied from the water vapor-supplying tube 30 and methane gas was supplied from the hydrocarbon supplying tube 34. The supply ratio of water to methane gas was 1:1 (by partial pressure). The mixed gas was heated to 140° C. by the preheater 28, and supplied from the inlet of quartz tube 10. The supply rate of the mixed gas was 20 ml/min. The temperature (reaction temperature) of the discharge region 16 in the quartz tube 10 was 120° C. and the reaction pressure was atmospheric pressure. A negative voltage of 2.0 kV was applied to the electrode 12 from the negative voltage power source 18. The electrode 14 is grounded. By applying the voltage of 2.0 kV, self-induced pulse discharge occurred between the electrodes, and the electric current was 7 mA. The pulse generation frequency of the self-induced pulse was measured by the digital oscilloscope 20, and the composition of the product gas was analyzed by gas chromatography.

As a result, the conversion ratio of methane gas was 90%, the selectivity to carbon monoxide was about 70%, and a synthesis gas having a hydrogen/CO ratio of 4.4 was produced. The pulse generation frequency was 180 times/second.

EXAMPLE 3

Steam Reforming of Propane

The same procedure as in Example 2 was repeated except that the hydrocarbon gas was propane gas, the distance between the electrodes was 3.5 mm, and the applied voltage was 3.5 kV. The electric current was 7.5 mA, and the pulse generation frequency was 150 times/min.

As a result, the conversion ratio of propane gas was 80%, the selectivity to carbon monoxide was 45%, and a synthesis gas having a hydrogen/CO ratio of 3.1 was produced. The yield of hydrogen (with respect to propane) was 370%.

INDUSTRIAL AVAILABILITY

By the method of the steam reforming according to the present invention, the selectivity to carbon monoxide is high, and various side reactions do not occur. The method may be carried out at a lower temperature under a lower pressure than in the conventional method, and may be carried out even without using a catalyst. Therefore, the method is useful as a method for steam reforming of chain hydrocarbons.

The invention claimed is:

1. A method for steam reforming of chain hydrocarbons comprising performing direct current pulse discharge in a mixed gas containing a gaseous chain hydrocarbon and water vapor so as to react said chain hydrocarbon and said water vapor to generate hydrogen and carbon monoxide.

2. The method according to claim 1, wherein said direct current pulse discharge is self-induced pulse discharge.

3. The method according to claim 1 or 2, wherein the number of pulses per second of said direct current pulse discharge is 5 to 500.

4. The method according to claim 1, wherein said mixed gas has a water vapor:chain hydrocarbon ratio in terms of partial pressure of 1:0.1-1.

5. The method according to claim 1, which is carried out by a continuous process wherein said chain hydrocarbon and said water vapor are continuously supplied.

6. The method according to claim 1, wherein said chain hydrocarbon is a $C_1$-$C_{10}$ alkane.

7. The method according to claim 6, wherein said chain hydrocarbon is a $C_2$-$C_{10}$ alkane.

8. The method according to claim 1, wherein said chain hydrocarbon has not less than two carbon atoms.

9. The method for steam reforming of claim 1, wherein said direct current pulse discharge is self-induced pulse discharge conducted by applying a constant voltage between two or more electrodes.

10. The method for steam reforming of claim 1, wherein the method is carried out at a temperature higher than the boiling points of said chain hydrocarbon and said water vapor, and is further carried out under atmospheric pressure.

11. A method for steam reforming of chain hydrocarbons comprising performing direct current pulse discharge in a mixed gas containing a gaseous chain hydrocarbon and water vapor so as to react said chain hydrocarbon and said water vapor to generate hydrogen and carbon monoxide, wherein the process is carried out in the absence of a catalyst.

* * * * *